(12) United States Patent
Buschek et al.

(10) Patent No.: US 9,538,146 B2
(45) Date of Patent: Jan. 3, 2017

(54) APPARATUS AND METHOD FOR AUTOMATICALLY DETECTING AN EVENT IN SENSOR DATA

(71) Applicant: SIEMENS AKTIENGESELLSCHAFT, Munich (DE)

(72) Inventors: Daniel Buschek, Munich (DE); Thomas Riegel, Hohenbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/363,833

(22) PCT Filed: Oct. 23, 2012

(86) PCT No.: PCT/EP2012/070948
§ 371 (c)(1),
(2) Date: Jun. 9, 2014

(87) PCT Pub. No.: WO2013/083327
PCT Pub. Date: Jun. 13, 2013

(65) Prior Publication Data
US 2014/0347480 A1     Nov. 27, 2014

(30) Foreign Application Priority Data

Dec. 7, 2011 (EP) .................................... 11192437
Jun. 1, 2012 (EP) .................................... 12170411

(51) Int. Cl.
*G06K 9/54* (2006.01)
*H04N 7/18* (2006.01)
(Continued)

(52) U.S. Cl.
CPC .......... *H04N 7/183* (2013.01); *G06K 9/00771* (2013.01); *G06K 9/6293* (2013.01)

(58) Field of Classification Search
None
See application file for complete search history.

(56) References Cited

U.S. PATENT DOCUMENTS 6,285,380 B1 * 9/2001 Perlin et al. .................. 345/473
8,966,569 B2 * 2/2015 Schwartz et al. ................ 726/1
(Continued)

FOREIGN PATENT DOCUMENTS

EP    2333736    *   6/2011
EP    2333736 A2    6/2011

OTHER PUBLICATIONS

MacArthur et al, Interactive Content-Based Image Retrieval Using Relevance Feedback, Computer Vision and Image Understanding 88, 55-75 (2002).*

(Continued)

Primary Examiner — Andrae S Allison
(74) Attorney, Agent, or Firm — Laurence Greenberg; Werner Stemer; Ralph Locher (57) ABSTRACT

An apparatus automatically detects an event occurring in sensor data. The apparatus has a recording device which is configured to receive the sensor data, a feature identification device which is configured to automatically identify a predetermined number of features of the sensor data in the recorded sensor data, an evaluation processing device which is configured to acquire from the predetermined number of features, for each of the features, an evaluation which relates to the event to be detected and which is based on a set of evaluation criteria, and a detection device which is configured to automatically acquire the event to be detected by the features identified by the feature identification device, based on the detected evaluations for the predetermined number of features.

13 Claims, 4 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 2006/0004683 A1* | 1/2006 | Talbot et al. | 706/59 |
| 2007/0005520 A1* | 1/2007 | Eick et al. | 706/12 |
| 2007/0094216 A1* | 4/2007 | Mathias et al. | 706/52 |
| 2007/0288418 A1* | 12/2007 | Pope et al. | 706/53 |
| 2008/0272902 A1* | 11/2008 | Kang et al. | 340/506 |
| 2011/0001812 A1* | 1/2011 | Kang et al. | 348/77 |
| 2012/0219223 A1* | 8/2012 | Hutter et al. | 382/190 |
| 2014/0016860 A1* | 1/2014 | Senechal et al. | 382/159 |

OTHER PUBLICATIONS

N. Adami et al. Forensic Reasoning upon Pre-Obtained Surveillance Metadata Using Uncertain Spatio-Temporal Rules and Subjective Logic, Analysis, Retrieval and Delivery of Multimedia Content, 125, Lecture Notes in Electrical Engineering 158, DOI: 10.1007/978-1-4614-3831-1_8, © Springer Science+Business Media New York 2013.*

Audun Josang, "Artificial reasoning with subjective logic", pp. 1-17; Proceedings of the Second Australian Workshop on Commonsense Reasoning; Jan. 1, 1997.

Maltoni Davide et. al., "Biometric Fusion", pp. 303-339; ISBN 978-1-84882-253-5; Handbook of Fingerprint Recognition; May 4, 2009.

Audun Josang, "Subjective Logic"; pp. 1-69; University of Oslo; Jan. 4, 2012.

* cited by examiner

APPARATUS AND METHOD FOR AUTOMATICALLY DETECTING AN EVENT IN SENSOR DATA

BACKGROUND OF THE INVENTION

Field of the Invention

The present invention discloses an apparatus for automatically detecting an event in sensor data. In addition, the present invention discloses a corresponding method.

In many applications, it is necessary to determine the occurrence of an event from sensor data, e.g. a video.

In video monitoring, for example, it is necessary to detect the intrusion of a person in a building, for example. Alternatively, it may be necessary to predict the occurrence of an earthquake in the logs of a seismograph, for example.

In order to detect such events or the occurrence of such events in a video or in the logs of a seismograph, different computer-aided methods are used today.

These involve particular features being extracted, for example in the case of video sequences in which it is desirable to find particular situations or events for which no direct or dedicated video analysis methods exist, however. To this end, known feature extractors (e.g. change detectors, object identifiers, etc.) are used, the results from which are just indicators of or pointers to the occurrence of the sought situation or the sought event. Therefore, all sections that contain at least one of the features are extracted from the video sequences today. The relevant sections then need to be examined by a human being for the purpose of rating and ultimate decision.

Particularly if the automatically produced features are individually only poorly suited to describing the search scenario, reliable limitation to or reliable exclusions from sections of a video sequence is possible only to a small degree, which means that a very time-consuming human check becomes necessary.

Finally, a search for an event can be tackled interactively by human expertise, which usually involves starting with the sections that have the most selective features and all suitable sections being rated sequentially by a human being.

An alternative option is specifically trained classifiers, which use a training set to learn their internal weights for the features found such that the prescribed training set is recognized with the desired accuracy. Said weights are then applied to the video sequence. However, these methods afford satisfactory results only if the training set correlates to the video sequence to a sufficient degree.

In addition, search systems are known that use a weighted sum of individual features as a search criterion. In this case, the individual features are weighted with a factor between 0 and 1, for example. The individual weighted dimensions of the individual features are then summed and result in a comparable dimension. These one-dimensional models provide no way of taking account of uncertainties in the calculation of the dimensions for the features. In addition, the features used in these systems (e.g. brightness, contrast, color, etc.) are not suited to performing a content-based search (a search for particular events).

EP 2333 736 A2 shows a method in which objects are detected in a video and the situations in which the objects find themselves are rated by means of what is known as "subjective logic".

BRIEF SUMMARY OF THE INVENTION

It is therefore an object of the present invention to provide a way of automatically examining sensor data for the occurrence of an event.

The invention achieves this object by means of the features of the independent claims.

Accordingly, the following are provided:

an apparatus for automatically detecting an event in sensor data, having a recording device that is designed to record the sensor data, a feature identification device that is designed to automatically identify a prescribed set of features of the sensor data in the recorded sensor data, a rating acquisition device that is designed to acquire a respective rating for each of the features from the prescribed set of features, which rating relates to the event to be detected and is formed on the basis of a set of rating criteria, and having a detection device that is designed to automatically detect the event to be detected by means of the features identified by the feature identification device on the basis of the acquired ratings for the prescribed set of features.

a method for automatically detecting an event in sensor data, having the steps of recording of the sensor data, automatic identification of a prescribed set of features of the sensor data from the recorded sensor data, acquisition of a respective rating for each of the features from the prescribed set of features, which rating relates to the event to be detected and is formed on the basis of a set of rating criteria, and automatic detection of the event to be detected by means of the identified features on the basis of the acquired ratings for the prescribed set of features.

The insight on which the present invention is based is that, for analysis of sensor data, simple features, such as the brightness or the saturation of an image or video, are only poorly suited to automatically drawing conclusions about the occurrence of an event in the sensor data.

The idea on which the present invention is based is thus that of taking account of this insight and providing a way of involving superior features of the sensor data in the detection of an event. In this case, superior features are understood to mean those features that require analysis of the content of an image, for example, and that are not just simple technical features, such as brightness or saturation.

In order to allow automatic analysis of sensor data, the present invention therefore provides for the expert knowledge of at least one expert for a stated task, e.g. the recognition of a situation in a video, to be requested and used for automatic analysis of the sensor data.

To this end, the present invention provides for a recording apparatus to record the sensor data, so that said sensor data can then be automatically analyzed.

The present invention also provides a feature identification device that automatically extracts particular prescribed features from the sensor data. In this case, the set of prescribed features may be prescribed by the availability of analysis algorithms and analysis options for the respective sensor data, for example.

The present invention is thus also based on the insight that even a human being can never rate the occurrence of an event in the sensor data with one hundred percent certainty. Instead, a human being assesses a multiplicity of features that he extracts from the sensor data and assesses these individual features, from which he then draws a conclusion.

Therefore, the present invention provides a rating acquisition device that allows an expert to provide a rating for each of the features from the set of features that can automatically be identified in the sensor data. In this case, the term "expert" is understood to mean a person who is capable of assessing the features in terms of their relevance to the event to be detected. An "expert" therefore does not have to have any particular specialist knowledge if said knowledge is irrelevant to the assessment of the event that is to be detected.

In this case, the expert has a set of rating criteria available that prescribes for the expert the framework for the rating of the features. By way of example, the expert can rate a relevance of a feature. In addition, the expert can also rate the reliability of the automatic identification of one of the features by the feature identification device, for example.

For the purpose of retrieving the ratings for the individual features, a set of rating criteria that corresponds to the rules of "subjective logic" is particularly appropriate.

"Subjective logic" allows an expert to provide a rating very intuitively as a "subjective opinion" using an opinion triangle. In this case, the expert has the option of using the opinion triangle to provide his appraisal in respect of the applicability, inapplicability, his uncertainty and an a priori probability in respect of the respective feature.

Further information regarding "subjective logic" can be found in the document "Subjective Logic" by Audun Jøsang, University of Oslo.

The detection device then takes the ratings, particularly takes the rated relevance of individual features to the event that is to be detected, and the features identified in the sensor data as a basis for establishing whether the event to be detected is contained in the sensor data.

The present invention thus allows the search for events that cannot be detected directly from the observed features to detect these events in the sensor data using a combination of weak indicators. This involves asking the opinion of an expert regarding the extent to which a particular feature contributes to the search task. As already outlined above, this can be done using the opinion triangle, for example.

Advantageous embodiments and developments can be found in the sub claims and in the description with reference to the figures.

In one embodiment, the recording device has at least one camera and/or a microphone and/or a position sensor and/or a location sensor and/or an accelerometer and/or a brightness sensor and/or further sensors for recording the sensor data.

This allows a multiplicity of sensor data items of different types to be recorded easily.

In one embodiment, the feature identification device is designed to, during identification; identify a prescribed pattern in the recorded sensor data. This allows the occurrence of particular recurring patterns in the sensor data to be established. In this case, a pattern may be a particular visual pattern in an image or video or else an audible pattern in a sound recording, or, by way of example, a pattern in the measurement series of a location, acceleration or brightness sensor or of another sensor (both in the time and frequency domains).

In addition or alternatively, the feature identification device is designed to, during identification; identify objects contained in sensor data that are present as an image recording and/or video recording. This allows a precise statement to be made about the content of an image or video. In this case, an object is intended to be understood to mean any object that can be automatically identified in the sensor data by a feature extractor.

In addition or alternatively, the feature identification device is designed to, during identification; identify the number of existent persons in the image recording and/or video recording. This embodiment is a special case of a feature extractor and allows persons to be identified in an image or video. This is advantageous particularly when the persons are connected to the event that is to be detected.

In addition or alternatively, the feature identification device is designed to, during identification, identify in the image recording and/or video recording the orientation and/or position and/or direction of movement and/or movement of at least one person contained in the image recording and/or video recording. This allows not only the existence of a person in an image or video to be identified but also further information to be provided that may be useful for detecting the event that is to be detected.

In addition or alternatively, the feature identification device is designed to, during identification; identify a change between at least two scenes in the video recording. Recognizing a scene change in a video allows a video to be broken down into its constituent parts and the latter to be analyzed separately.

In addition or alternatively, the feature identification device is designed to, during identification; identify a sound that potentially indicates occurrence of the event to be detected in sensor data that are present as a sound recording. The recognition of a prescribed sound corresponds to a special case of pattern recognition and allows sounds to be detected that provide explicit pointers to an event that is to be detected.

In addition or alternatively, the feature identification device is designed to, during identification; identify a change between at least two scenes in the sound recording. Recognizing a scene change in a sound recording allows the sound recording to be broken down into its constituent parts and the latter to be analyzed separately.

In addition or alternatively, the feature identification device is designed to, during identification, identify in the sound recording at least one number of human voices that is contained in the sound recording. This embodiment is a special case of a feature extractor and allows persons to be identified in a sound recording.

This is advantageous particularly when the persons are connected to the event that is to be detected.

In one embodiment, the set of rating criteria has an acceptance value and/or a rejection value and/or an uncertainty value and/or a base value. In addition, the rating acquisition device is designed to acquire an appropriate acceptance value and/or an appropriate rejection value and/or an appropriate uncertainty value and/or an appropriate base value for each rating. These parameters correspond to the coefficients used in the "subjective logic" for the "subjective opinions". If the ratings of an expert are requested in accordance with the "subjective logic", it becomes a very simple matter to use the calculation of the "subjective logic" to detect an event that is to be detected in the sensor data.

In one embodiment, the detection device is designed to calculate, for the extracted features, on the basis of arithmetic rules corresponding to the set of rating criteria, a respective opinion value for at least one excerpt from the recorded sensor data for the event that is to be detected. This opinion value can then be projected onto a one-dimensional probability value. This allows an easily comparable dimension to be calculated and provided for the relevant excerpt from the sensor data.

In one embodiment, a threshold value acquisition device is provided that is designed to acquire, for at least one of the features from the set of features, a threshold value formed on the basis of the set of rating criteria and to exclude from the detection of the feature that is to be detected those excerpts from the recorded sensor data for which the at least one feature is below the corresponding prescribed threshold value. This allows the computation involvement for the subsequent calculations to be decreased.

In one embodiment, the detection device is designed to calculate, for the acquired ratings, on the basis of the arithmetic rules corresponding to the set of rating criteria, a respective opinion value for at least one excerpt from the recorded sensor data for the event that is to be detected. This allows an easily comparable dimension to be calculated and provided for the ratings too.

In one embodiment, the detection device is designed to, during detection, identify at least one excerpt from the sensor data for which a probability of occurrence of the event that is to be detected exceeds an opinion value, and the probability value derived therefrom, calculated from the acquired ratings, on the basis of the arithmetic rules corresponding to the set of rating criteria and the opinion values calculated for the extracted features. This allows very simple detection of an event in sensor data.

The above embodiments and developments can, if useful, be combined with one another as desired. Further possible embodiments, developments and implementations of the invention also comprise combinations that are not explicitly mentioned for features of the invention that are described above or below for the exemplary embodiments. In particular, a person skilled in the art would also add individual aspects to the respective basic form of the present invention as improvements or additions.

The present invention is explained in more detail below with reference to the exemplary embodiments that are indicated in the schematic figures of the drawings, in which:

DESCRIPTION OF THE INVENTION

Elements and apparatuses that are the same or have the same function have—unless stated otherwise—be provided with the same reference symbols throughout the figures.

Figure 1:
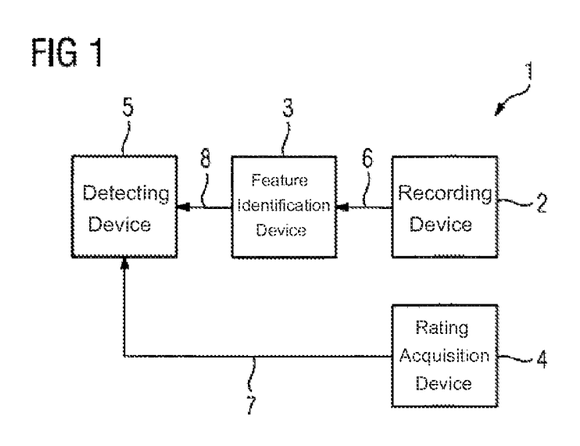
FIG. 1 shows a block diagram of an embodiment of an apparatus according to the invention.

FIG. 1 shows a block diagram of an embodiment of an apparatus 1 according to the invention.

The apparatus 1 in FIG. 1 has a recording device 2 that is coupled to a feature identification device 3. The feature identification device 3 in turn is coupled to a detection device 5. The apparatus 1 also has a rating acquisition device 4 that is likewise coupled to the detection device 5.

In one embodiment, the recording device 2 is embodied as a video camera 2 that records the sensor data as a video recording 6.

The video camera 2 makes this video recording 6 available to the feature identification device 3, which identifies a multiplicity of features 8 in the video recordings 6. In this case, the feature identification device 3 can process the video recording 6 in real time or wait until the whole video recording 6 is available before the features 8 in the video recording are analyzed. To this end, the video recording 6 can also be buffer-stored in a data memory, for example.

The feature identification device 3 in FIG. 1 is designed to identify in the video recording 6 the number of persons that are existent in a scene, the orientation of the persons and/or of their faces, the duration of the scene and the position of the scene in the video recording automatically. For this, in one embodiment, the feature identification device 3 can make use of a multiplicity of known feature extractors.

In addition, the rating acquisition device 4 is designed to request, as ratings from an expert, a relevance (e.g. as "subjective opinions") or else what is known as an opinion value for the features 8 that the feature identification device 3 has identified. As ratings from a user, the rating acquisition device 4 thus requests a relevance to the features:

Number of persons existent in a scene;
Orientation of the persons and/or their faces;
Duration of the scene; and
Position of the scene in the video recording from a user. In this case, it is possible for values, for example, to be prescribed for the individual features 8 and the expert rates the relevance of a feature 8 in combination with the prescribed values. This models the understanding of the expert in relation to the given task and renders it able to be used for automatic calculations.

By way of example, for the number of persons, it is possible to prescribe that three persons need to be visible in a scene in order to satisfy the feature 8 of "number of persons existent in a scene". If only two persons are identified in a scene, this feature 8 is deemed not to be satisfied. However, it is also possible, for example, for two features to be defined for the "number of persons existent in a scene", with first three and then two persons or other numbers of persons being prescribed.

In the embodiment in FIG. 1, the ratings 7 are modeled in a suitable manner as "subjective opinions", which are created on the basis of the principles of "subjective logic", i.e. the ratings correspond as precisely as possible to the real circumstances which actually arise. An embodiment of the rating acquisition device 4 is explained in more detail under FIG. 4.

Finally, the detection device 5 takes the identified features 8, the rating model, which emerges from the set of rating criteria, and the requested relevances of the features 8 in the sensor data 6 as a basis for detecting an event that is to be detected on the basis of the calculation of the "subjective logic".

In an extremely simple and extremely intuitive case, the individual ratings 7 modeled by an expert are cumulated by means of an AND function. This cumulation by means of an AND function is expressed in the "subjective logic" using the ^ operator.

Prior to the cumulation of the individual ratings 7 by means of a conjunction corresponding to the "subjective logic", it is also possible for threshold value formation to take place, which removes those features 8 whose relevance to the detection of the event is below a prescribed threshold from the set of features 8. This allows the computation involvement for the subsequent calculations to be decreased. The respective threshold value can also be presented as an opinion value in this case.

Next, the detection device 5 calculates a one-dimensional probability value for each scene from the cumulated ratings 7. Using the calculated probability value, the detection device 5 creates an order for the individual scenes beginning with that scene that has the highest probability value.

Since the detection of events can, in principle, be carried out not with one hundred percent certainty but rather only with a corresponding level of probability, the term detection is intended to be understood to mean not exact detection but rather estimation of the existence of an event in the sensor data.

Accordingly, those scenes that have the highest values for the cumulated ratings 7 are those scenes that have the highest probability of containing the event that is to be detected.

In one embodiment, it may be an object, by way of example, to identify in a television program in which a moderator makes bets with the guests of the television program those scenes in which the moderator announces a bet.

In this embodiment, the set of features comprises, by way of example:

Time interval for a scene to the bet;
Duration of the scene;
Number of faces in the scene;
Number of faces that are visible in the scene in profile.

Figure 3:
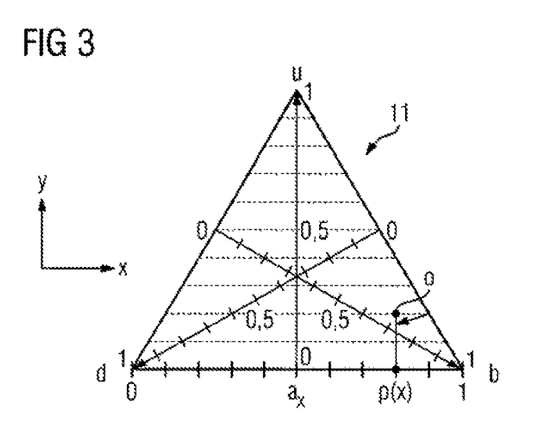
FIG. 3 shows a graph of an embodiment of a rating according to the invention.

An expert rates each feature 8 in accordance with his perception of the relevance of the respective feature 8. To this end, he has four parameters available, which he can enter for each feature 8 in an opinion triangle 11, for example, in accordance with the "subjective logic". The parameters are the applicability of a feature, the inapplicability of a feature, the uncertainty of the expert with regard to the respective features and the a priori probability of occurrence of the feature. A corresponding opinion triangle 11 is shown in FIG. 3.

Finally, the detection device 5 cumulates the relevant ratings 7 for each scene and outputs an order of precedence for the scenes, the scenes being cited in accordance with the value of the cumulated ratings 7.

In one embodiment, the feature identification device 3, the rating acquisition device 4 and the detection device 5 are in the form of computer program modules that are provided on a commercially available computer that is operated with a Windows or Linux operating system, for example.

In further embodiments, the feature identification device 3, the rating acquisition device 4 and the detection device 5 are in the form of application-specific integrated circuits, in the form of programmable logic kits, in the form of microcontrollers or generally in the form of hardware, software, firmware or any combination of these.

Figure 2:
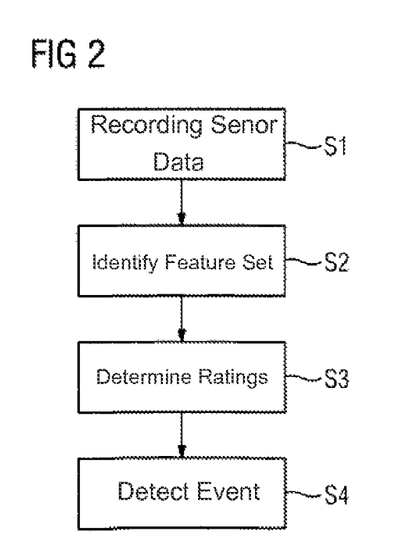
FIG. 2 shows a flowchart of an embodiment of a method according to the invention.

FIG. 2 shows a flowchart of an embodiment of a method according to the invention.

In a first step S1, the sensor data 6 are recorded. Next, in a second step S2, a prescribed set of features 8 of the sensor data 6 is automatically identified in the recorded sensor data 6.

In a third step S3, a respective rating 7 for each of the features 8 from the prescribed set of features 8, which rating relates to the event to be detected and is formed on the basis of a set of rating criteria, is modeled by an expert.

Finally, in a fourth step S4, the event to be detected is automatically detected by means of the identified features 8 on the basis of the modeled ratings for the prescribed set of features 8.

FIG. 3 shows a graph of an embodiment of a rating 7 according to the invention in an opinion triangle 11.

FIG. 3 shows an opinion triangle 11 based on the rules of "subjective logic" that is in the form of an isosceles triangle 11. In FIG. 3, the triangle 11 is oriented such that the bottom side of the triangle 11 is horizontal.

In addition, a respective arrow is shown as a dimension axis from the center of each of the sides of the triangle 11 to that corner of the triangle 11 that is opposite the respective side. In this case, the origin of the arrow presents a value of 0 in each case and the end of an arrow presents a value of 1. In this case, the arrow from the bottom side of the triangle 11 to the top corner of the triangle 11 presents the value "u". In addition, the arrow from the left-hand side of the triangle 11 to the bottom right corner of the triangle 11 presents the value "b". Finally, the arrow from the right-hand side of the triangle 11 to the bottom left corner of the triangle 11 presents the value "d".

When a rating (opinion) is entered in the opinion triangle 11 of FIG. 3, this rating always satisfies the condition:

$$b+d+u=1$$

In this case, the value "b" ("belief") represents how much the expert believes that this feature is relevant to the detection of the event. In the same way, the value "d" ("disbelief") represents how little the expert believes that this feature is relevant to the detection of the event. The value "u" indicates how certain the expert is that his appraisal is correct. In addition, a value "a", also called "atomicity", that represents the a priori probability of a feature is always also indicated in an opinion triangle 11.

In FIG. 3, a rating O has been entered that has a value "b" of 0.7, a "d" value of 0.1 and a "u" value of 0.2, and also an "$a_x$" value of 0.5 (without limiting the generality). This allows an expert to express that he regards the respective feature as thoroughly important to the detection of the event ("b"=0.7). In addition, the rating in FIG. 3 expresses that the expert is also relatively certain ("u"=0.2) of his rating.

In the opinion triangle 11, a vertical line is also shown from the rating O to the bottom side of the triangle 11. The projection point from O parallel to the straight line through the points "u" and "$a_x$" on the vertical line on the bottom side of the triangle 11 denotes the probability of the relevant feature 8, in accordance with the conventional probability consideration, being applicable, and can therefore assume a value between 0 (bottom left corner of the triangle 11) and 1 (bottom right corner of the triangle 11).

In FIG. 3, a value $a_x$=0.5 is also shown in the center of the bottom axis of the triangle 11, which value is what is known as the atomicity for the opinion triangle 11.

Figure 4:
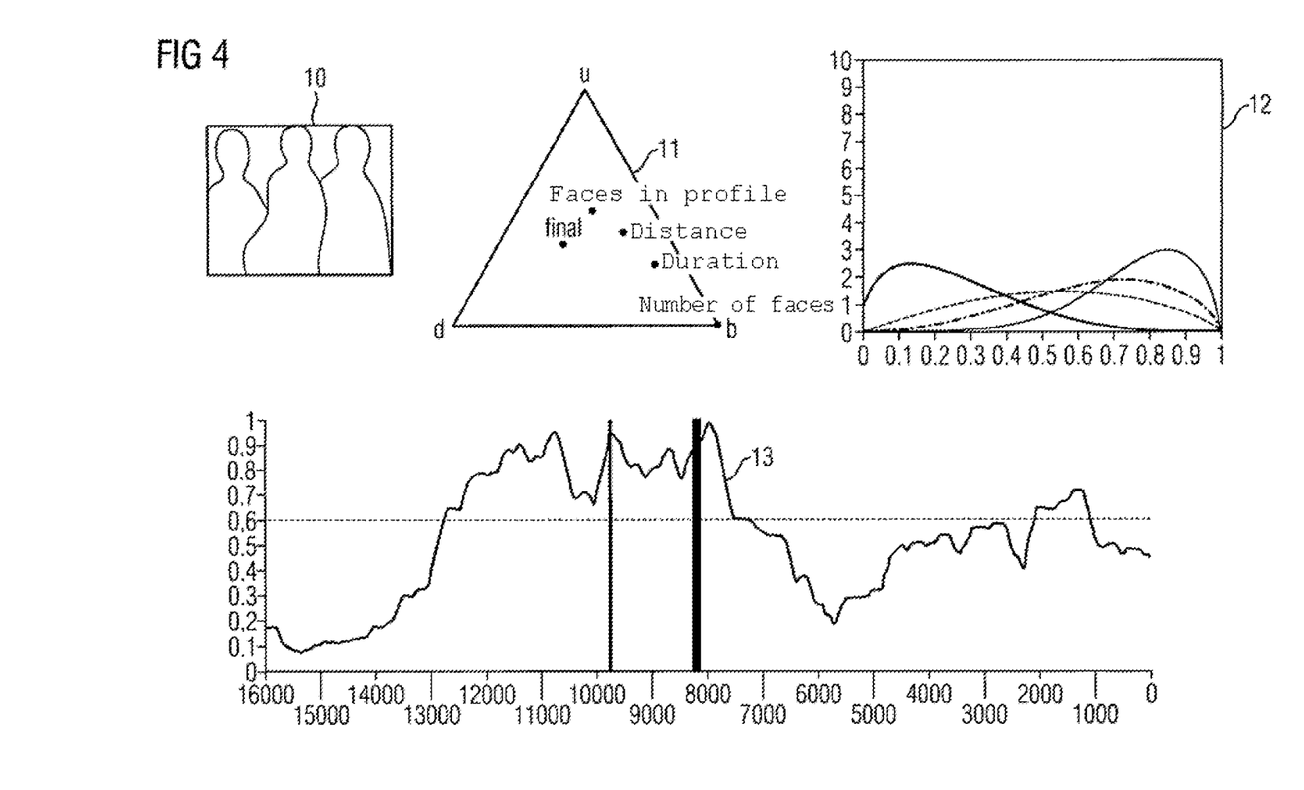
FIG. 4 shows an illustration of an embodiment of a rating acquisition device according to the invention.

FIG. 4 shows an illustration of an embodiment of a rating acquisition device 4 according to the invention.

The rating acquisition device 4 in FIG. 4 is shown as a representation of a computer screen in which an expert can input his ratings for the relevance for a multiplicity of features 8 in an opinion triangle 11. In this case, FIG. 4 relates to the example in FIG. 1 in which scenes are analyzed from a program whose content is the making of bets with the guests of the program. The object is furthermore to identify those scenes in which the respective bets are announced.

To this end, the rating acquisition device 4 has an upper area in which an excerpt 10 from the sensor data, the opinion triangle 11 and the probability density functions 12 of the individual ratings are displayed to the user.

In a lower portion of the rating acquisition device 4, the user is shown the profile over time for the probability value of the individual sections of the sensor data.

In the opinion triangle 11 in FIG. 4, four ratings 7 and the rating value "final" cumulated there from have been entered. The ratings 7 relate to the number of faces that are visible in profile, the interval of time from the scene to the bet, the duration of the scene and the number of faces that have been identified in the scene.

The lower area of the rating acquisition device 4 shows a probability value curve that indicates the probability value for the individual scenes of the program in accordance with the current ratings 7. In addition, two scenes for which the probability value exceeds a prescribed (e.g. requested from an expert) minimum value are marked.

Figure 5:
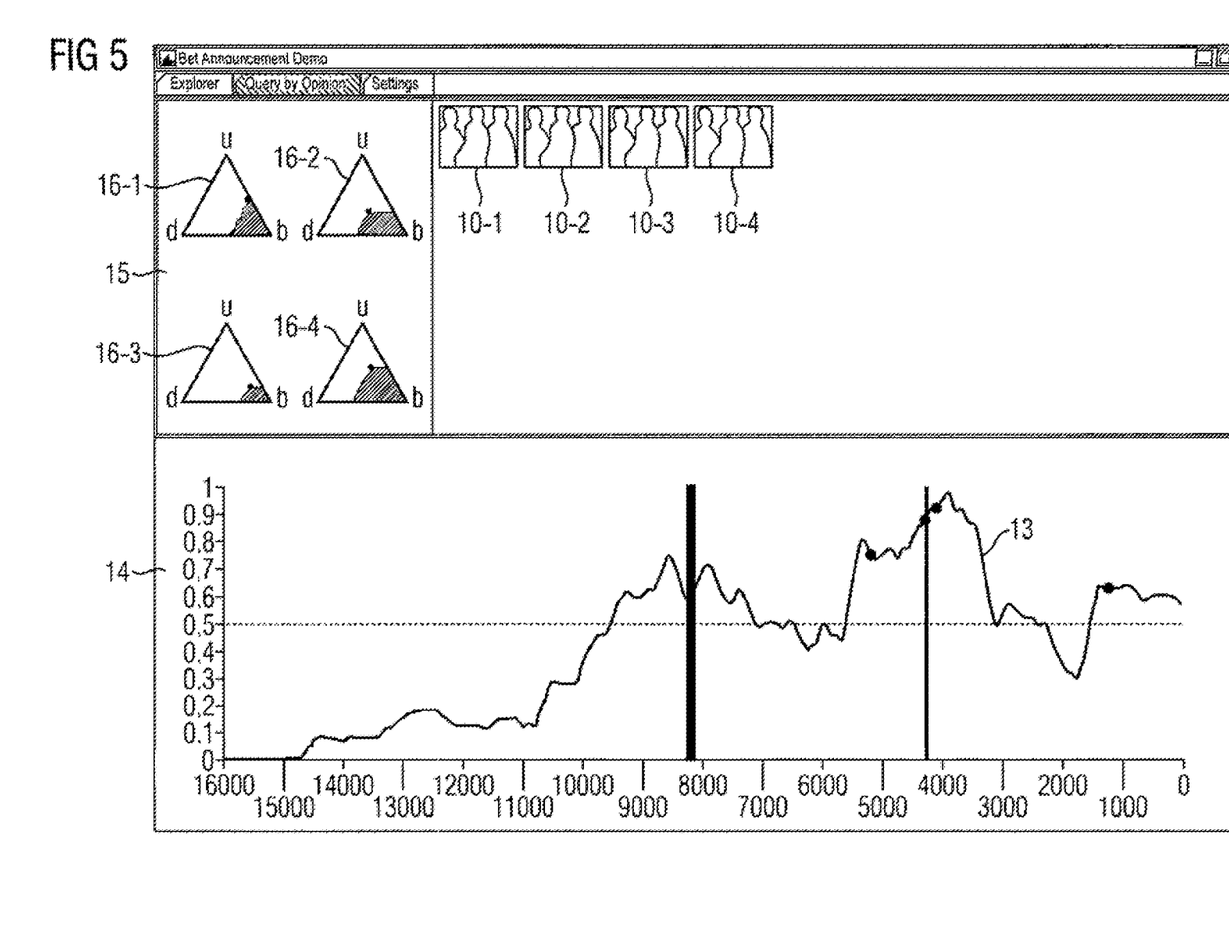
FIG. 5 shows an illustration of an embodiment of a threshold value acquisition device according to the invention.

FIG. 5 shows an illustration of an embodiment of a threshold value acquisition device 14 according to the invention.

The threshold value acquisition device 14 in FIG. 5 is likewise shown as a representation of a computer screen in which an expert can input four threshold values 16-1-16-4 implemented as an opinion in the form of a triangle representation for the four features:

Interval of time from a scene to the bet;
Duration of the scene;
Number of faces in the scene; and
Number of faces that are visible in the scene in profile.

In this case, FIG. 5 likewise relates to the example in FIG. 1 in which scenes are analyzed from a program whose content is the making of bets with the guests of the program. The object is furthermore to identify those scenes in which the respective bets are announced.

To this end, the threshold value acquisition device 14 has an upper area in which four opinion triangles with threshold values 16-1-16-4 for the aforementioned features are displayed to the user or expert in a threshold value device 15. By drawing a point, e.g. using a computer mouse, or by pointing to the point on a touch screen, the user or expert can stipulate the respective threshold values 16-1-16-4 in these opinion triangles. In the further calculations for detecting S4 the event that is to be detected, only those excerpts 10-1-10-4 from the sensor data for which all features are above the relevant threshold value 16-1-16-4 are then used and displayed in the upper area as image details.

In the lower portion of the threshold value acquisition device 14, the user is shown the profile over time for the probability value of the individual sections of the sensor data.

If a threshold value acquisition device 14 is provided, the number of calculations can be reduced. In addition, the number of excerpts from the sensor data that a person possibly needs to analyze following detection can be reduced.

Although the present invention has been described above with reference to preferred exemplary embodiments, it is not limited thereto but rather can be modified in a wide variety of ways. In particular, the invention can be altered or modified in diverse ways without departing from the essence of the invention.

The invention claimed is:

1. An apparatus for automatically detecting an event in sensor data, the apparatus comprising:
a recording device for recording the sensor data;
a feature identification device for automatically identifying a prescribed set of features of the sensor data in the sensor data recorded;
a rating acquisition device for acquiring a respective rating for each of the features from the prescribed set of features, the respective rating relating to the event to be detected and is formed on a basis of a set of rating criteria, the set of rating criteria being based on at least one input interactively provided by a human expert for rating each of the features;
a detection device for automatically detecting the event to be detected by means of the features identified by said feature identification device on a basis of acquired ratings for the prescribed set of features, said detection device determining a probability value for each of a plurality of individual sections of the sensor data from the acquired ratings of the features;
a display device for showing the human expert a profile over time of the probability value of the individual sections of the sensor data; and
a threshold value acquisition device for acquiring, for at least one of the features from the set of features, a threshold value formed on a basis of the set of rating criteria and to exclude from a detection of the feature that is to be detected those excerpts from the sensor data recorded for which the at least one feature is below a prescribed threshold value.

2. The apparatus according to claim 1, wherein said recording device has at least one device selected from the group consisting of cameras, microphones, position sensors, location sensors, accelerometers and brightness sensors for recording the sensor data.

3. The apparatus according to claim 1, wherein:
said feature identification device is configured to, during identification:
identify a pattern in the sensor data recorded; and/or
identify objects contained in the sensor data that are present as an image recording and/or video recording; and/or
identify a number of existent persons in the image recording and/or the video recording; and/or
identify in the image recording and/or the video recording an orientation and/or position and/or direction of movement and/or movement of at least one person contained in the image recording and/or the video recording; and/or
identify a change between at least two scenes in the video recording; and/or
identify a sound that potentially indicates occurrence of the event to be detected in the sensor data that are present as a sound recording; and/or
identify a change between at least two scenes in the sound recording; and/or
identify in the sound recording at least one number of human voices contained in the sound recording.

4. The apparatus according to claim 1, wherein:
the set of rating criteria has an acceptance value and/or a rejection value and/or an uncertainty value and/or a base value; and
said rating acquisition device configured to acquire the acceptance value and/or the rejection value and/or the uncertainty value and/or the base value for each said rating.

5. The apparatus according to claim 1, wherein said detection device is configured to calculate, for extracted features, on a basis of arithmetic rules corresponding to the set of rating criteria, a respective opinion value for at least one excerpt from the sensor data recorded for the event that is to be detected.

6. The apparatus according to claim 1, wherein said detection device calculates, for the acquired ratings, on a basis of arithmetic rules corresponding to the set of rating criteria, a respective opinion value for at least one of the excerpts from the sensor data recorded for the event that is to be detected.

7. The apparatus according to claim 1, wherein said detection device, during detection, identifies at least one of the excerpts from the sensor data for which a probability of occurrence of the event that is to be detected exceeds the probability value calculated from the acquired ratings, on a basis of arithmetic rules corresponding to the set of rating criteria and opinion values calculated for the extracted features.

8. A method for automatically detecting an event in sensor data, which comprises the steps of:
- recording of the sensor data;
- automatically identifying a prescribed set of features of the sensor data from recorded sensor data;
- modeling a respective rating for each of the features from the prescribed set of features, the respective rating relating to the event to be detected and is formed on a basis of a set of rating criteria, the set of rating criteria being based on at least one input interactively provided by a human expert for rating each of the features;
- acquiring a threshold value formed on a basis of the set of rating criteria for at least one of the features from the set of features, and excerpts from the recorded sensor data for which the at least one feature is below a prescribed threshold value are excluded from a detection of the feature that is to be detected;
- determining a probability value for each of a plurality of individual sections of the sensor data from acquired ratings of the features and showing the human expert a profile over time of the probability value of the individual sections of the sensor data; and
- automatically detecting the event to be detected by means of identified features on a basis of the acquired ratings for the prescribed set of features.

9. The method according to claim 8, which further comprises recording the sensor data by means of at least one recording device selected from the group consisting of cameras, microphones, position sensors, location sensors, acceleration sensors and brightness sensors.

10. The method according to claim 8, wherein during the automatically identifying step, performing at least one of:
- identifying a pattern in the recorded sensor data;
- identifying objects contained in the sensor data that are present as an image recording and/or video recording;
- identifying a number of existent persons in the image recording and/or the video recording;
- identifying an orientation and/or position and/or direction of movement and/or movement of at least one person contained in the image recording and/or the video recording in the image recording and/or the video recording;
- identifying a change between at least two scenes in the video recording;
- identifying a sound that potentially indicates occurrence of the event to be detected in the sensor data that are present as a sound recording;
- identifying a change between at least two scenes in the sound recording; or
- identifying at least one number of human voices contained in the sound recording.

11. The method according to claim 8, wherein:
- the set of rating criteria has an acceptance value and/or a rejection value and/or an uncertainty value and/or a base value; and
- the acceptance value and/or the rejection value and/or the uncertainty value and/or the base value is acquired and/or modeled during acquisition of the ratings for each of the features.

12. The method according to claim 8, wherein for automatic analysis, performing the following steps:
- calculating a respective opinion value for at least one excerpt from the recorded sensor data for the event that is to be detected, for the extracted features on a basis of arithmetic rules corresponding to the set of rating criteria; and
- calculating a respective opinion value for at least one of the excerpts from the recorded sensor data for the event that is to be detected for the acquired ratings on a basis of the arithmetic rules corresponding to the set of rating criteria.

13. The method according to claim 12, wherein during the automatically detecting step, identifying at least one of the excerpts from the sensor data, on a basis of the arithmetic rules corresponding to the set of rating criteria and opinion values calculated for the extracted features, for which a probability of occurrence of the event that is to be detected exceeds the probability value calculated from the acquired ratings.

* * * * *